United States Patent [19]

Brice

[11] Patent Number: 4,568,368
[45] Date of Patent: Feb. 4, 1986

[54] ELECTROSTATIC POWDER COATING APPARATUS

[75] Inventor: Larry D. Brice, Athens, Ga.

[73] Assignee: Westinghouse Electric Corp., Pittsburgh, Pa.

[21] Appl. No.: 638,332

[22] Filed: Aug. 6, 1984

[51] Int. Cl.$^4$ ............................................. B01D 46/18
[52] U.S. Cl. ...................................... 55/290; 55/351; 98/115.2; 118/634
[58] Field of Search .......................... 55/290, 351, 354; 98/115.2; 118/634

[56] References Cited

U.S. PATENT DOCUMENTS

| | | | |
|---|---|---|---|
| 3,083,515 | 4/1963 | Morris et al. | 55/290 |
| 3,127,256 | 3/1964 | Boylan | 55/351 |
| 4,153,008 | 5/1979 | Marino et al. | 55/290 |
| 4,257,345 | 3/1981 | Brice | 55/351 |

Primary Examiner—Bernard Nozick
Attorney, Agent, or Firm—D. R. Lackey

[57] ABSTRACT

Electrostatic powder coating apparatus having an outer filter belt from which excess powder is removed by an elongated pick-up tube which extends across the width of the belt. The ends of the filter belt, instead of being joined, are overlapped, such that the uppermost end of the belt faces the direction which is opposite to the travel direction of the belt, avoiding interference with the powder pick-up tube.

6 Claims, 3 Drawing Figures

ELECTROSTATIC POWDER COATING APPARATUS

BACKGROUND OF THE INVENTION

1. Field of the Invention

The invention relates in general to electrostatic powder coating apparatus, and more specifically, to such apparatus having a movable filter belt which cooperates with a pick-up tube to return excess powder to the powder supply.

2. Description of the Prior Art

My U.S. Pat. No. 4,257,345 discloses electrostatic powder coating apparatus having a movable filter belt extending through the interior of an enclosure. A suction device is operably connected through an exhaust plenum disposed below the portion of the filter belt within the enclosure, which causes air and excess powder within the enclosure to be drawn towards one face of the filter belt. The filter belt has a predetermined permeability which allows the passage of air therethrough to the exhaust plenum, while collecting the excess powder on the one face thereof. A cleaning device removes the excess powder from the one face of the filter belt, and, through a separator, directs the excess powder to a supply container for reapplication to the workpieces to be coated.

A second movable belt, hereinafter called the wear belt, is disposed in registry with the innermost surface of the filter belt, to prevent sliding contact between the filter belt and the exhaust plenum. This sliding contact, prior to my invention, resulted in rapid abrasion of the filter belt as the filter belt moved through the enclosure. The wear belt is formed of a coarse, monofilment, synthetic material, such as polyester, arranged in the form of a mesh or screen and having a permeability greater than or equal to the permeability of the filter belt.

While the wear belt prevents the abrasion of the filter belt and greatly extends the useful life of the filter belt, it would be desirable to prevent the wear which still occurs between the filter belt at its joint and the vacuum pick-up tube at the exit end of the enclosure. In the prior art, the ends of the filter belt are joined to form a continuous loop. The belt joint is then covered with a flap which is sewn to the outer surface of the belt, to seal any open area at the joint and to protect it from abrasion. Also, a backing material, such as a polyester mesh, is adhered to the inner side of the filter, to cover the joint area and provide strength and abrasion resistance. With this design, however, the belt is still subject to fairly rapid abrasion at the flap and where the backing material is glued to the belt, as the joint area passes under the vacuum pick-up tube.

SUMMARY OF THE INVENTION

Briefly, the present invention relates to new and improved electrostatic powder coating apparatus having a filter belt constructed to substantially eliminate wear between the filter belt and vacuum pick-up tube. In addition to solving the wear problem in the joint area, the new filter belt is much less costly to fabricate and install.

Instead of joining the ends of the filter belt, the filter belt is made from a single piece of filter fabric having a length which is somewhat longer than the required loop length, with the excess length overlapping the leading edge. In other words, the uppermost end of the belt faces a direction which is opposite to the travel direction of the filter belt. The belt joint, flap and backing are all eliminated. The sides of the filter belt may be attached to the drive chains, in the same manner as the underlying wear belt, or it may be attached directly to the wear belt, as desired.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
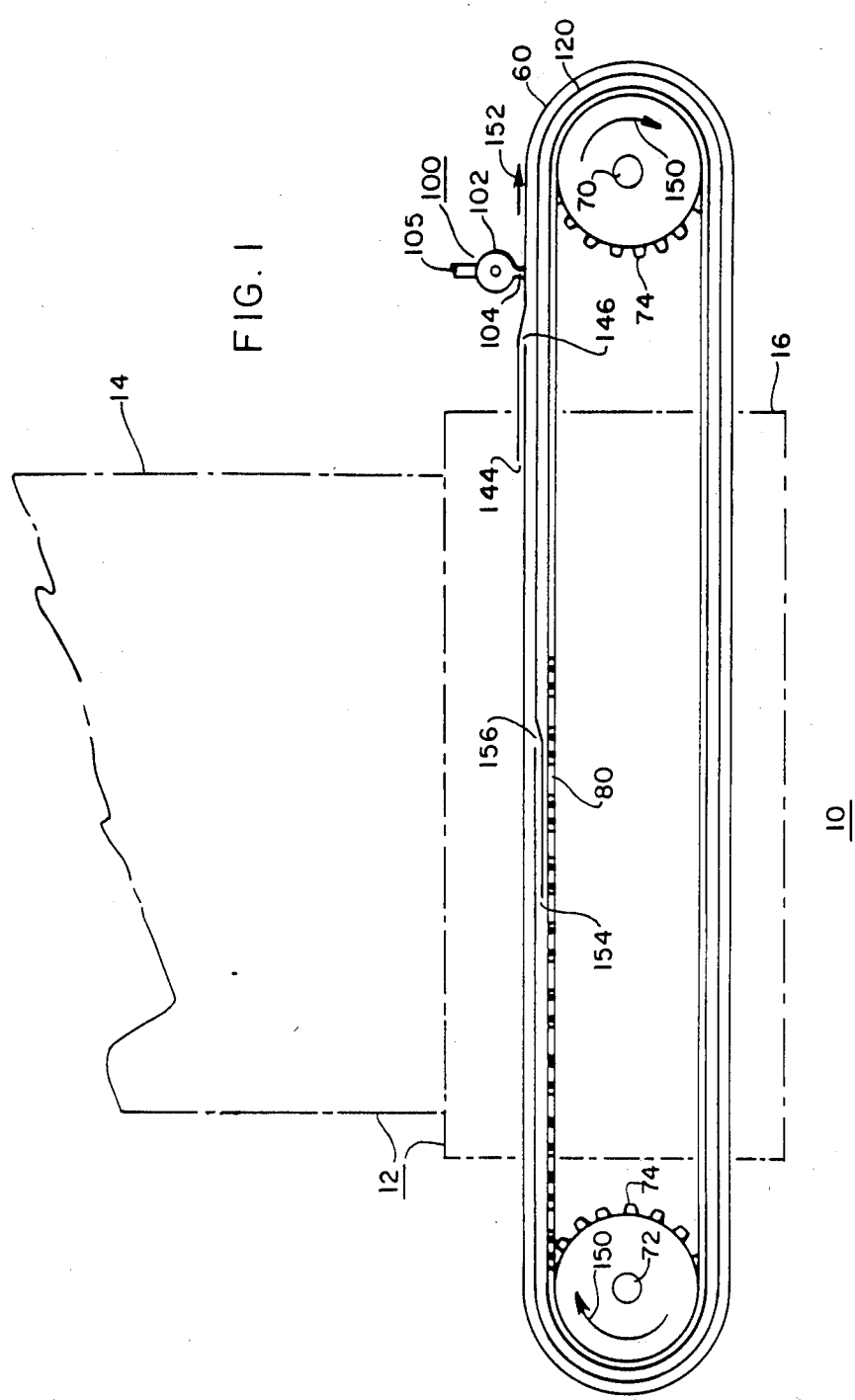
FIG. 1 is an elevational view, partially in phantom, of electrostatic powder coating apparatus constructed according to the teachings of the invention.

Except for the construction of the filter belt, the electrostatic powder coating apparatus may be the same as shown in detail in my U.S. Pat. No. 4,257,345. Accordingly, this U.S. Patent is hereby incorporated into the present application by reference. Like reference numerals in this and in the incorporated patent indicate like components.

Figure 2:
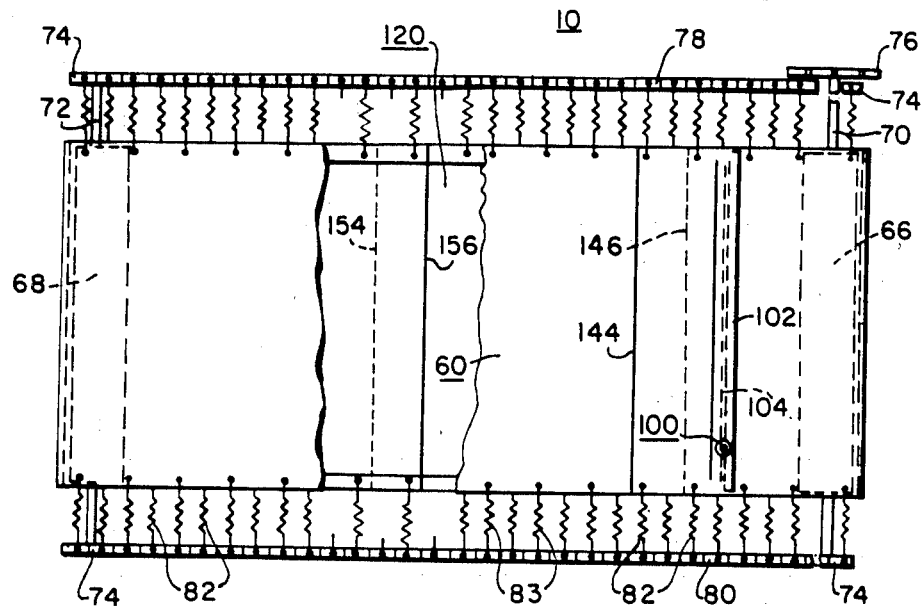
FIG. 2 is a plan view of the belt portion of the electrostatic powder coating apparatus shown in FIG. 1.

Referring now to the drawings, and to FIGS. 1 and 2 in particular, there is shown powder coating apparatus 10 constructed according to the teachings of the invention. Apparatus 10 includes an enclosure or spray booth 12, shown in phantom, which includes upper and lower sections 14 and 16, respectively. The upper section 14 of the spray booth 12 includes a passageway having openings for receiving workpieces and the associated conveyor.

Figure 3:
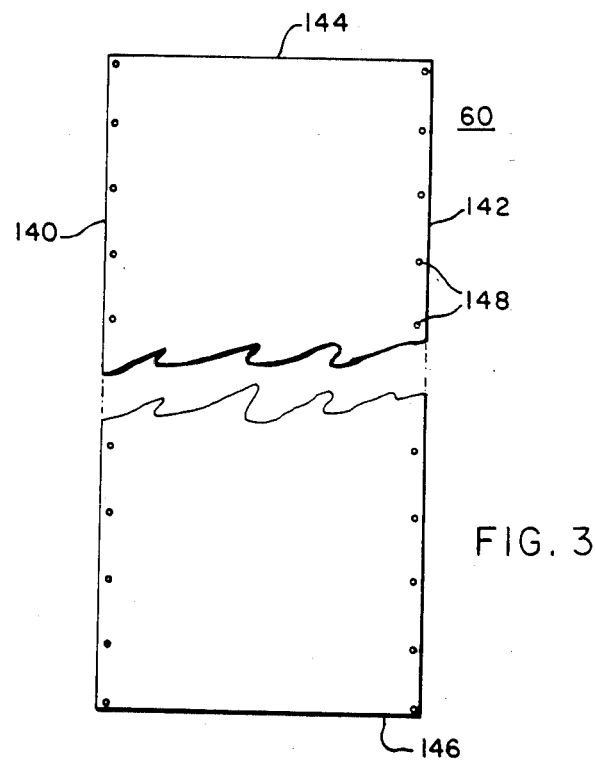
FIG. 3 is a plan view of the filter belt shown in FIGS. 1 and 2.

In the lower housing 16 of enclosure 12, there is disposed a movable filter belt 60, shown in detail in FIG. 3, and a movable wear belt 120. The filter and wear belts 60 and 120, respectively, are each disposed in a loop, with the wear belt 120 being disposed within the loop of the filter belt. These concentric and radially adjacent loops are guided about rollers 66 and 68 disposed at opposite ends of apparatus 10. Each of the rollers 66 and 68 are concentrically disposed about operating shafts 70 and 72, respectively, which further include sprockets 74 at the ends thereof. One of the rollers, such as roller 66, may be driven in a predetermined direction by means of a suitable drive source, such as a drive sprocket 76 and a motor (not shown), which is connected to the operating shaft 70 of roller 66. Drive chains 78 and 80 are operably coupled to the sprockets 74.

The wear belt 120 is connected by a plurality of springs 82 to the drive chains 78 and 80, such that application of the drive force to the operating shaft 70 of roller 66 will cause the wear belt 120 to move in a predetermined direction of travel through the enclosure 12.

The filter belt 60 may be attached to the wear belt, or it may be connected by a plurality of springs 83 to the drive chains 78 and 80, as desired.

As shown in detail in the incorporated patent, the inner surface of the looped filter belt 60 faces the open or suction side of a suction device which includes an exhaust plenum or trough. A grate or wire screen forms the top of the trough. The interior of the tough is connected with the suction side of an exhaust blower. During the powder coating operation, powder which does not remain attached to the workpiece is drawn with the air in the enclosure 12 towards the filter belt 60. The filter belt 60 is constructed of a material selected to have a predetermined permeability, to allow the passage of air therethrough into the exhaust plenum, while the excess powder is deposited on the outer surface of the filter belt 60. The permeability of the filter belt 60 is selected to prevent substantial penetration of the powder through the filter belt, such as 50–70 CFM per square foot.

During the course of its travel, filter belt 60 leaves the interior of enclosure 12 and carries therewith the excess powder which is collected on its outer surface during its passage through enclosure 12. Cleaning means 100 is provided outside enclosure 12 to remove the excess powder from the outer surface 62 of filter belt 60. Cleaning means 100 may include a cylindrical tube 102 which extends substantially across the entire width of filter belt 60, and further it is disposed in close proximity to the outer surface 62 of the filter belt 60. The cylindrical tube 102 includes a suction slot 104 which faces the outer surface 62 of the filter belt 60, along the entire length of cylindrical tube 102. Cylindrical tube 102 is connected by a connection tube or conduit 105 through a separator (not shown) to the suction side of a blower. The blower creates a suction or vacuum effect which removes the excess powder from the outer surface 62 of the filter belt 60, through tube 102 and conduit 105 to a separator, wherein the powder is separated or filtered from the exhaust air. The outlet of the separator is connected to the supply container to return excess powder to the supply container for reapplication to workpieces.

In the prior art, the ends of the filter belt 60 are joined together. For example, a connector may be attached to each end of the filter belt, with each connector being in the form of closely-spaced, parallel, wire loops. The openings in the loops of one connector are aligned with the openings in the loop of the other connector, and a wire is inserted through the aligned openings. These wire loops are then covered with a flap which is sewn to the upper or outer surface of the belt 60, to seal any open areas around the joint, and to protect the joint area from abrasion. A backing material is glued to the lower surface of the filter belt to provide strength and abrasion resistance. This is a costly construction, and the filter belt 60 is still subject to substantial wear in the joint area, as it passes under the vacuum pick-up 100.

According to the present invention, as illustrated in FIG. 3, the filter belt 60 is constructed of a single length of felt material having first and second lateral edges 140 and 142, respectively, and first and second ends 144 and 146, respectively. If the filter belt 60 is attached to the chains via springs 83, the only modification to belt 60 is the addition of grommets 148, such as No. 2 grommets spaced along each lateral edge 140 and 142 of the belt 60. The ends 144 and 146 are devoid of fastener means. In one embodiment of the invention, the filter belt 60 was constructed of 0.09 inch thick polypropylene felt, glazed on one side, having a permeability of 50–70 CFM per square foot. The length was approximately 60 feet, and the width was 76 inches. The grommets were spaced 10 inches apart. The glazed side is used as the outermost side during use.

The length of belt 60 is selected to be slightly longer than the required loop length, and instead of connecting the ends 144 and 146 together, the ends 144 and 146 are overlapped. When the sprockets are driven in the direction of arrows 150 as shown in FIG. 1, the filter belt 60 travels in the direction of arrow 152, and the ends 144 and 146 are overlapped with end 144 on top, such that end 144 faces the direction which is opposite to the belt travel direction. While it was thought necessary in the prior art to join ends 144 and 146 of the outermost belt 60, I have found that the belt 60 is subjected to substantially less wear, and that the belt 60 may be fabricated for less cost, resulting in a substantial purchase price reduction. For example, a filter belt 60 having the hereinbefore-mentioned dimensions and constructed according to the teachings of the prior art has a purchase price of approximately $3500, while a filter belt constructed according to the teachings of the invention, with the only modification being the addition of the grommets, has a purchase price of $435. The filter belt 60 is normally replaced about twice each year, thus resulting in a substantial yearly savings per powder coating apparatus, as well as enjoying the savings in time required to change filter belts. Finally, the prior art wear problem in the area of a joint has been virtually eliminated by the disclosed arrangement.

The wear belt 120 may also have first and second lateral edges and a length slightly longer than the required loop length, defined by first and second ends 154 and 156, respectively. Ends 154 and 156 are overlapped, with the overlapping configuration being opposite to the overlapping configuration utilized by the filter belt 60. In other words, the outermost end 156 of the wear belt 120 faces the direction of belt travel. If the ends of the wear belt 120 are overlapped, the overlapped ends of the wear belt 120 should be circumferentially spaced from the overlapped ends of the filter belt 60, as shown in FIG. 1, in order to prevent a build-up in thickness which might intefere with the powder pick-up device 100.

I claim as my invention:

1. An electrostatic powder coating installation, comprising:
   an enclosure having airborne powder therein,
   a filter belt disposed in a loop,
   said filter belt having first and second major surfaces, first and second ends and first and second lateral edges,
   said filter belt being permeable to air but not to said airborne powder,
   drive means for moving said looped filter belt through the enclosure in a predetermined direction,
   means for moving air within said enclosure towards said filter belt, with the first major surface of said filter belt being an outer surface upon which powder may collect as the drive means moves said filter belt through said enclosure,
   powder removal means disposed in close promixity to the first major surface of said filter belt, for removing powder from said filter belt,
   said filter belt having a length in a direction between its first and second ends which exceeds the loop length,
   means attaching the first and second lateral edges of said filter belt to said drive means while overlapping the first and second ends, said first and second ends of the filter belt being devoid of joining means, said first and second ends being overlapped such that the uppermost end of the loop is directly exposed to the powder as the filter belt is driven through said enclosure, with the overlapped first and second ends providing a powder seal, said uppermost end of the filter belt loop being oriented to face the direction opposite to said predetermined travel direction, to prevent interference between said uppermost belt end and the powder removal means.

2. The electrostatic powder coating apparatus of claim 1 wherein the drive means includes first and second spaced chains disposed in loops adjacent to the first and second lateral edges of the filter belt, and means linking the first and second lateral edges with said first and second chains, respectively.

3. The electrostatic powder coating apparatus of claim 1 wherein the drive means includes a wear belt disposed in a loop, with the filter belt being disposed about the looped wear belt, said wear belt having a permeability to air at least as great as the filter belt.

4. The electrostatic powder coating apparatus of claim 2 wherein the wear belt has first and second ends and first and second lateral edges, and a length between its ends which exceeds its loop length, with the ends of the wear belt being overlapped and oriented such that the uppermost end faces the predetermined travel direction.

5. The electrostatic powder coating apparatus of claim 3 wherein the overlapping ends of the filter belt are circumferentially spaced from the overlapped ends of the wear belt.

6. The electrostatic powder coating apparatus of claim 3 wherein the drive means includes first and second spaced chains disposed in loops adjacent the first and second lateral edges of the filter belt, and means linking the first and second lateral edges of said wear belt and of said filter belt, with said first and second chains, respectively.

* * * * *